United States Patent [19]

Takishima et al.

[11] Patent Number: 5,111,612
[45] Date of Patent: May 12, 1992

[54] PLANT CULTURE APPARATUS

[75] Inventors: Seiji Takishima; Yuji Hirosawa; Hiromitsu Takada; Fumito Takagi, all of Tokyo, Japan

[73] Assignee: Shimizu Construction Co., Ltd., Tokyo, Japan

[21] Appl. No.: 504,130

[22] Filed: Apr. 3, 1990

[30] Foreign Application Priority Data

Apr. 25, 1989 [JP] Japan .................................. 1-105494

[51] Int. Cl.$^5$ ............................................ A01G 31/00
[52] U.S. Cl. ........................................................ 47/60
[58] Field of Search ................................ 47/60, 62, 17

[56] References Cited

U.S. PATENT DOCUMENTS

| 2,459,693 | 1/1949 | Gordon | 250/483.1 |
| 2,713,629 | 7/1955 | Etzkorn | 250/458.1 |
| 3,330,981 | 7/1967 | Aia | 250/483.1 |
| 3,636,352 | 1/1972 | Wanmaker | 250/483.1 |
| 3,848,385 | 11/1974 | Thompson | 52/28 |
| 4,163,342 | 8/1979 | Fogg et al. | |
| 4,543,744 | 11/1985 | Royster | 47/60 |

FOREIGN PATENT DOCUMENTS

| 0140361 | 5/1985 | European Pat. Off. . |
| 1034681 | 8/1983 | U.S.S.R. ................... 47/DIG. 6 |
| 1417833 | 8/1988 | U.S.S.R. . |
| 1349001 | 3/1974 | United Kingdom . |
| 2037554 | 7/1980 | United Kingdom . |
| 2133664 | 12/1982 | United Kingdom . |

Primary Examiner—Henry E. Raduazo
Attorney, Agent, or Firm—Oblon, Spivak, McClelland, Maier & Neustadt

[57] ABSTRACT

In a plant culture apparatus, plants being cultured are accommodated in a body. A culture bed is arranged within the body for culturing the plants. An illuminating device is arranged within the body for emitting a light to the plants on the culture bed. A gas-conditioning device is mounted to the body for recirculating gas therethrough. The illuminating device includes a lighting unit for emitting ultraviolet rays to the plants, and a transducing unit arranged below the lighting device for transducing the ultraviolet rays emitted from the lighting unit, to visible radiation. The transducing unit has long-wave absorbability and is formed by a plate element having its entire surface which is coated with phosphor.

15 Claims, 10 Drawing Sheets

DISTRIBUTION OF INTENSITY OF LIGHT (ACCORDING TO METHOD OF INVENTION)

FIG. 8(b)

DISTRIBUTION OF INTENSITY OF LIGHT (ACCORDING TO CONVENTIONAL METHOD)

PLANT CULTURE APPARATUS

BACKGROUND OF THE INVENTION

The present invention relates to a plant culture apparatus for artificially culturing a plurality of plants such as vegetables or the like.

Conventionally plants such as vegetables are primarily cultured constant amount of harvest because the amount of harvest increases or decreases according to the relationship between the insolation or solar radiation and rainfall or precipitation. In view of this in recent years, in the case where farm crops such as vegetables or the like are cultured, the method of hydroponic culture has been utilized in which a nutrient solution is used to culture the plants instead of growing the plants in soil.

The hydroponic culture is also adapted for the purposes of conserving soil fertility in the fields, enabling sequential cropping, avoiding damage by disease and noxious insects, increasing efficiency of energy use and automatization of the culture, and increase in production. The hydroponic culture is high in production cost compared to raising plants outdoors. In view of the fact that regulation or control of nutrients and treatment of a remained root are easy, however, hydroponic culture is utilized as a method of culturing vegetables such as leaf vegetables or the like.

Figure 10:
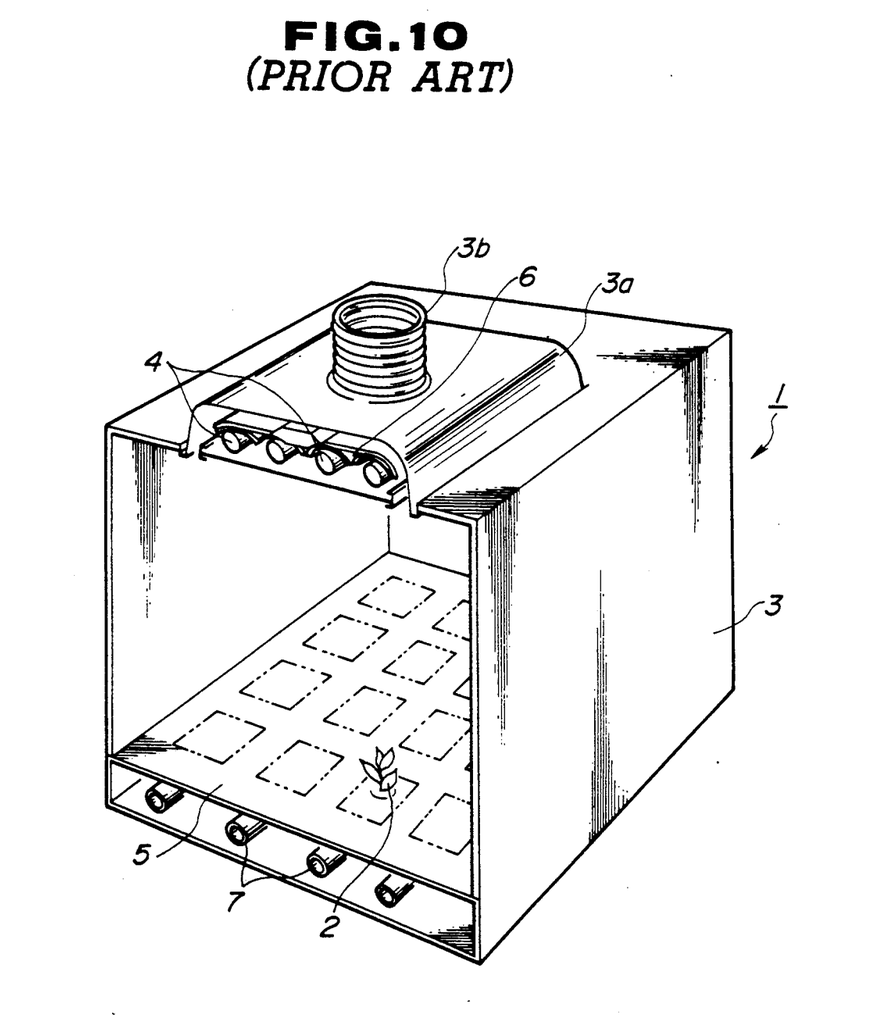
FIG. 10 is a perspective view of the conventional plant culture apparatus, with one of four side walls removed.

As an example, a plant culture apparatus has been proposed as shown in FIG. 10.

The plant culture apparatus 1 comprises a body 3 within which a plurality of plants 2 being cultured are accommodated. A plurality of fluorescent lamps 4 are arranged within the body 3 and serve as an illuminating device for supplying light to the plants 2. A culture bed 5 is arranged below the fluorescent lamps 4, and the plants 2 rest on the culture bed 5.

The body 3 is formed by a box-like container made of a heat insulating material. The body 3 has its upper surface which is provided with a fluorescent-lamp accommodating section 3a. A duct 3b is arranged on an upper surface of the fluorescent-lamp accommodating section 3a, and opens to the ambient atmosphere.

Figure 11:
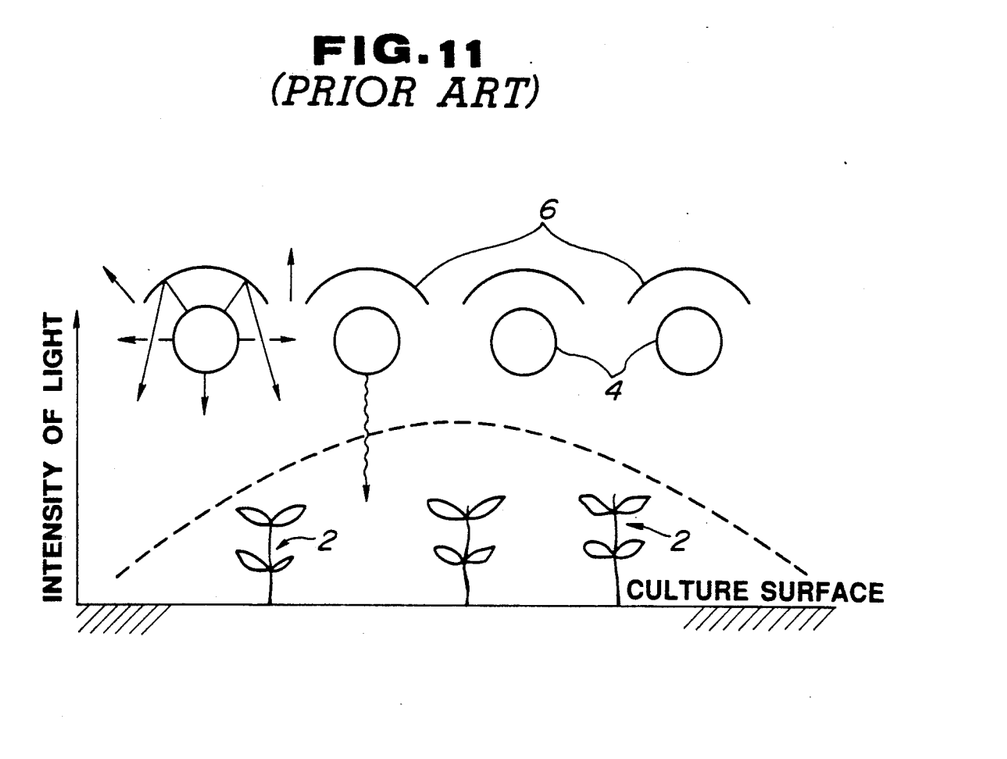
FIG. 11 is a schematic view showing an illuminating method due to the conventional plant culture apparatus illustrated in FIG. 10, and the relationship between a culture surface and the intensity of light.

The fluorescent lamps 4 are arranged at an upper portion of the body 3 and are spaced from each other at constant intervals. As shown in FIG. 11, a plurality of reflecting plates 6 are arranged respectively above the fluorescent lamps 4.

Referring back to FIG. 10, the culture bed 5 is made of a water sheet material absorbent. Furthermore, a plurality of liquid nutrient supply units 7 for the plants 2 are mounted to the culture bed 5.

When the plant culture apparatus is being used, seeds of the plants 2 to be cultured rest on the culture bed 5. The liquid nutrients are replenished to the culture bed 5 from the liquid nutrients supply units 7, and the plants 2 are cultured while the amount of light and the temperature are suitably adjusted by the fluorescent lamps 4.

Figure 12:
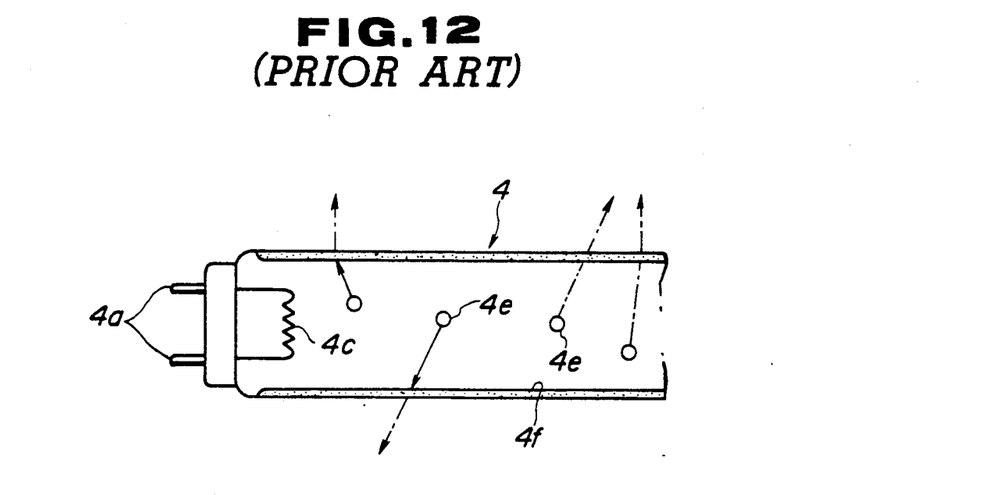
FIG. 12 is a fragmentary cross-sectional side elevational view of one of the fluorescent lamps illustrated in FIG. 10.
Figure 13:
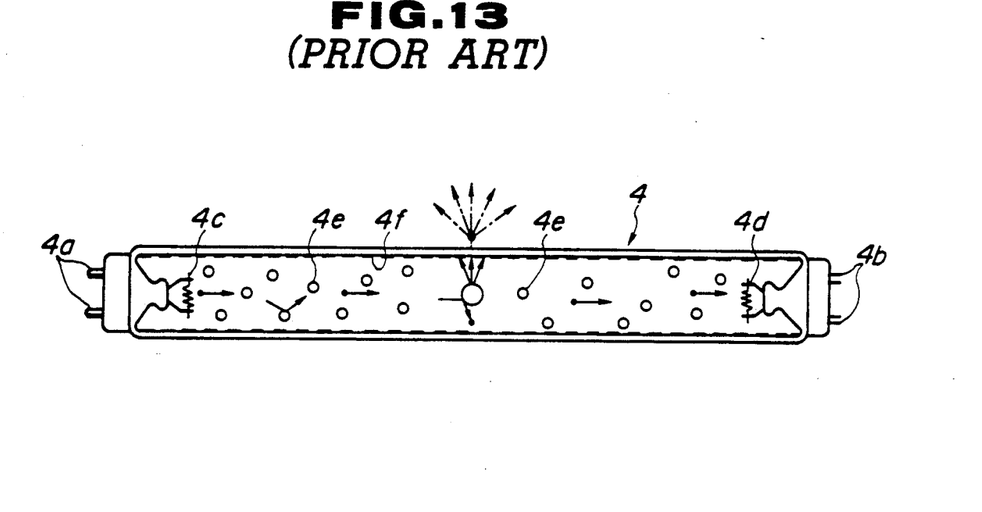
FIG. 13 is a cross-sectional side elevational view of the fluorescent lamp illustrated in FIG. 12.

As shown in FIGS. 12 and 13, voltage is applied to a pair of electrodes 4a and 4b of each of the fluorescent lamps 4. When the voltage exceeds a predetermined value, thermoelectrons 4e flow from a coil filament 4c of the fluorescent lamp 4 toward a coil filament 4d thereof. The thermoelectrons 4e occurring due to electric discharge move as indicated by the arrows in FIGS. 12 and 13, and are transduced into visible radiation when the thermoelectrons 4e pass through a phosphor or fluophor 4f which is coated on an inner surface of the fluorescent lamp 4.

With regard to heat generated due to the fluorescent lamps 4, useless or unnecessary heat is removed from the plant culture apparatus 1 and is sent to the outside through the duct 3b.

It is possible for the plant culture apparatus 1 described above to provide constant culturing conditions without variation due to natural phenomena such as the weather and the like. However, the following problems remain to be solved.

(1) In the conventional fluorescent lamps 4 which serve as the illuminating device, visible radiation is emitted from the entire length of the fluorescent lamps 4. Accordingly, the illuminating light from the respective fluorescent lamps 4 is such that the intensity of light on the culture surface is non-uniform in horizontal distribution.

Figure 14:
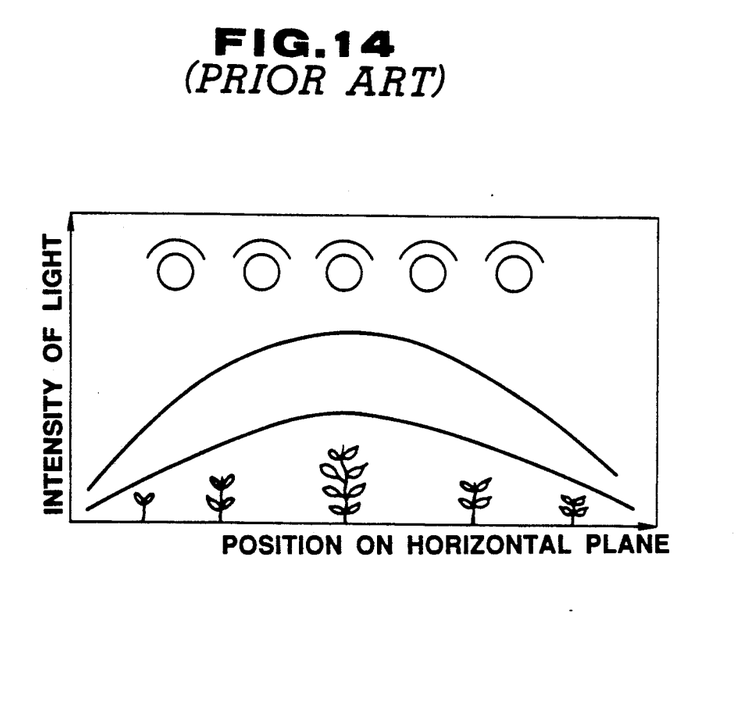
FIG. 14 is a view showing the relationship between a position on a horizontal plane on a culture bed, and the intensity of light and growing speed in the conventional plant culture apparatus illustrated in FIG. 10.

That is, as shown in FIGS. 11 and 14, the intensity of light due to the light emitted from the fluorescent lamps 4 is high at a central region of the culture bed 5, and gradually falls off toward both ends of the culture bed 5. Thus, the plants 2 located at the central region of the culture bed 5 grow fastest, while the plants 2 located at both ends of the culture bed 5 grow more slowly. Accordingly, even if the seeds of the plants 2 are planted simultaneously it is impossible to culture the plants 2 uniformly due to the differences in growth rate.

(2) In spite of the fact that the reflecting plates 6 are arranged respectively above the fluorescent lamps 4, as indicated by the arrows in FIG. 11, some of the light emitted from the respective fluorescent lamps 4 is not directed toward the culture surface but instead escapes above or lateral to the fluorescent lamps 4. Thus, this energy is wasted.

Figure 15:
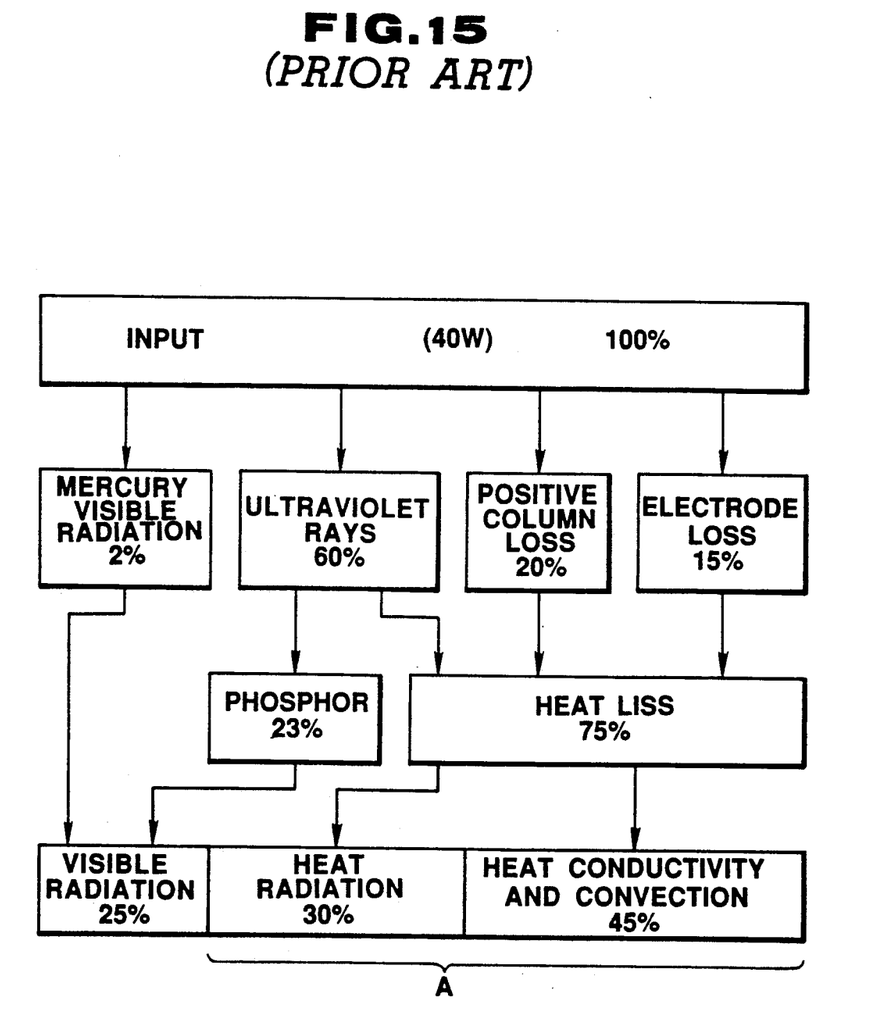
FIG. 15 is a chart showing the energy conversion efficiency of the fluorescent lamp illustrated in FIG. 10.

(3) As shown in FIG. 15, generally, the conversion efficiency of the fluorescent lamps 4 is as follows. That is 75% (indicated by A in FIG. 15) of input power is lost as heat and this heat results in a cooling load. In the conventional heat-removing method described previously, the air within the culture space is used to remove the heat generated by the illumination. Accordingly, there is a case where the cooling load is not reduced. Thus, the conventional heat-removing method is not efficient.

(4) Heat emitted from the fluorescent lamps 4 may exert deleterious effect on the plants 2, and increases the cooling load.

SUMMARY OF THE INVENTION

It is therefore an object of the present invention to provide a plant culture apparatus capable of uniformly delivering light delivering a greater proportion of energy as to a culture bed and a light reaching the culture bed, and which is capable of efficiently removing heat generated by the lights.

According to the invention, there is provided a plant culture apparatus comprising:
- a body within which a plurality of plants being cultured are accommodated;
- a culture bed arranged within the body for culturing the plants;
- illuminators arranged within the body for emitting light to the plants on the culture bed; and
- air-conditioning means mounted to the body for re-circulating air therethrough,
- wherein the illuminator includes a light emitter for emitting ultraviolet rays toward the plants and transducer arranged below the light emitter for transducing the ultraviolet rays emitted from the light emitter to visible radiation, and wherein the transducer can absorb long-wave radiation and is formed as a plate having its entire surface which is coated with phosphor.

When the plants are cultured by the use of the above-described plant culture apparatus according to the invention, the plants being cultured are first set into the cultured bed. After an appropriate number of plants have been planted, the light emitter of the illuminator begins emission of the ultraviolet rays in order to give to the plants, the light required for photosynthesis and heat for promoting growth. The ultraviolet rays emitted from the light emitter are converted to visible radiation when the ultraviolet rays pass through the transducer located below the light emitter.

The phosphor coated on the surface of the transducer serves to transduce the wavelengths of the ultraviolet rays emitted from the light emitter, to visible radiation. Furthermore an excessive light is absorbed by the long-wave absorbing plate which is a major component of the transducing means.

The light transduced into the visible radiation by the transducer is emitted to the plants on the culture bed.

Moreover, if the temperature within the plant culture apparatus is raised due to emission of light from the illuminator, the air-conditioner mounted on the apparatus is operated to recirculate air through the apparatus. By the operation of the air-conditioner, the heated air within the apparatus can be returned into the apparatus, or the conditioned air can be supplied to a culture space.

In the manner described above, the ultraviolet rays emitted from the light emitter are uniformly and efficiently emitted to the culture bed through the transducer. Thus, it is possible to make the intensity of light of the visible radiation uniform over the culture bed. Accordingly, if the time the seeds germinate and the supply of nutrients liquid are made uniform the plants will grow at a uniform rate so that it is possible to obtain plants of uniform size, and it is possible to obtain a predictable.

Furthermore, even if the illuminator produces a large amount of waste heat, the air conditioner mounted on the body is operated to effect heat exchange between the interior air and the outside, whereby it is possible to easily remove the excess heat generated.

In this manner, according to the plant culture apparatus of the present invention, it is possible to effectively or efficiently utilize the light emitted to the culture bed and the light reaching the culture bed, and it is possible to effectively remove the heat generated by emission of light from the illuminator.

DESCRIPTION OF THE EMBODIMENTS

Figure 1:
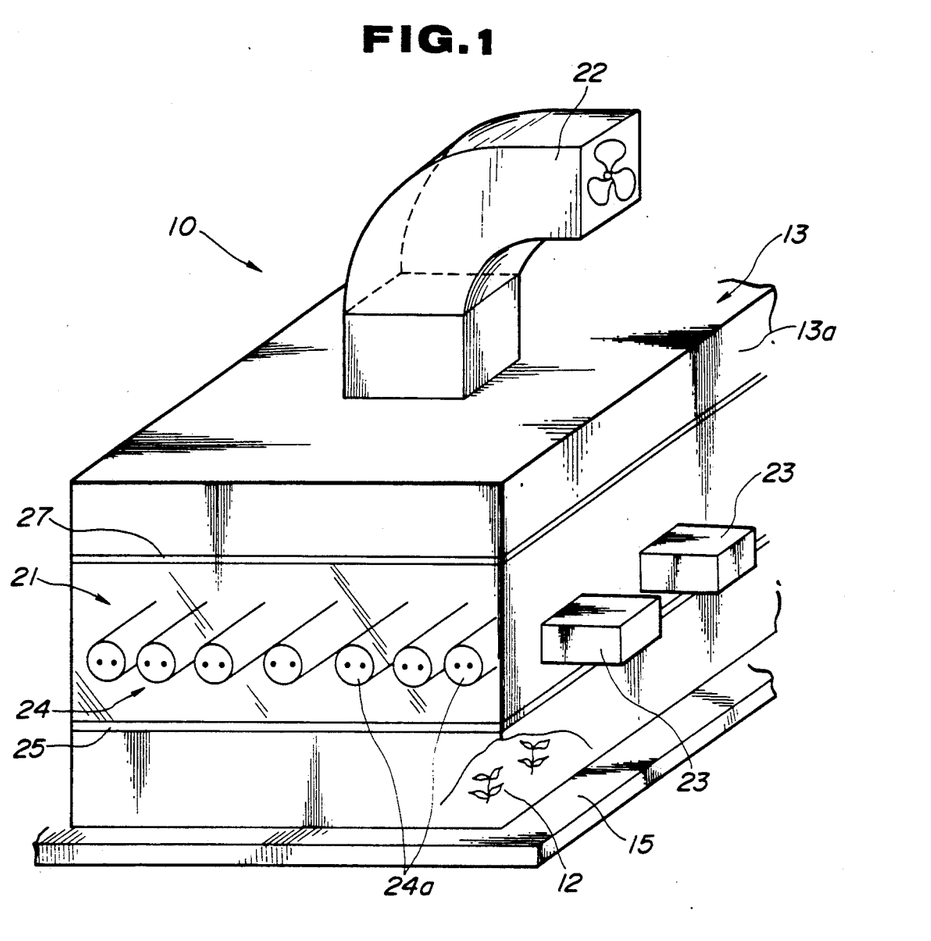
FIG. 1 is a fragmentary perspective view of a plant culture apparatus according to an embodiment of the invention.

Referring first to FIG. 1, there is shown a plant culture apparatus, generally designated by the reference numeral 10, according to an embodiment of the invention. The plant culture apparatus 10 comprises a body 13 within which a plurality of plants 12 being cultured are accommodated. A culture bed 15 is arranged within the body 13 for culturing the plants 12. An illuminating device 21 is arranged within the body 13 at a location above the culture bed 15 for emitting light to the plants 12.

Figure 3:
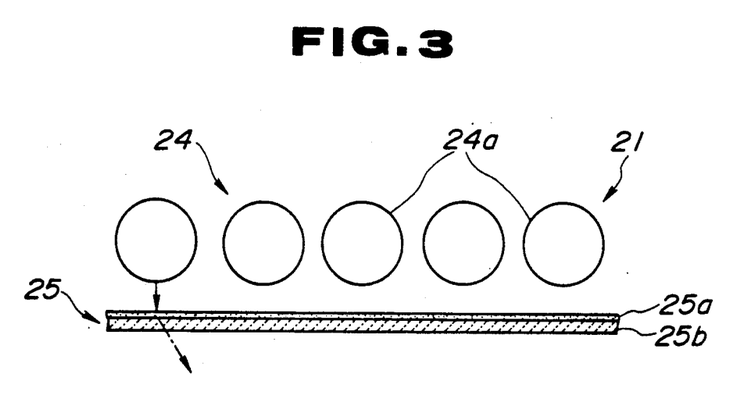
FIG. 3 is a fragmentary cross-sectional side elevational view of an illuminating device of the plant culture apparatus illustrated in FIG. 1.

An introducing duct 22 and a pair of discharge ducts 23, which cooperate with each other for conditioning air, are mounted to the body 13 for recirculating the air or air therethrough. That is, gas-conditioning means has the introducing duct 22 and the discharge ducts 23 which are mounted to the body 13. Air is introduced into the body 13 from the ambient atmosphere through the introducing duct 22, whereas air is discharged from the body 13 to the ambient atmosphere through the discharge ducts 23. The illuminating device 21 includes a light unit 24 for emitting ultraviolet rays to the plants 12, and a transducing unit 25 arranged below the light unit 24 for transducing the ultraviolet rays emitted from the light unit 24, to visible radiation. As shown in FIG. 3, the transducing unit 25 the ability to absorb radiation long-wave and is formed by a plate element 25b having its entire surface which is coated with phosphor or fluophor 25a.

As shown in FIG. 1, the body 13 is formed by a box-like container 13a which is made of a heat insulating material. The introducing duct 22 is mounted to an upper surface of the container 13a, and the discharge ducts 23 are mounted to one of peripheral side walls of the container 13a at a location above the transducing unit 25. Furthermore, an air intake (not shown) for the air conditioner, which opens to the outside air, is provided on one of the peripheral side walls of the container 13a at a location below the transducing unit 25, while a discharge duct (not shown) for the air conditioner, which opens to the outdoor air, is provided on another one of the peripheral side walls of the container 13a.

The container 13a has an inner surface which is coated with a reflecting material for increasing the reflection factor of the light from the illuminating device 21.

The culture bed 15 is arranged at the bottom of the body 13 and is formed of a water-absorbent a sheet material.

Figure 4:
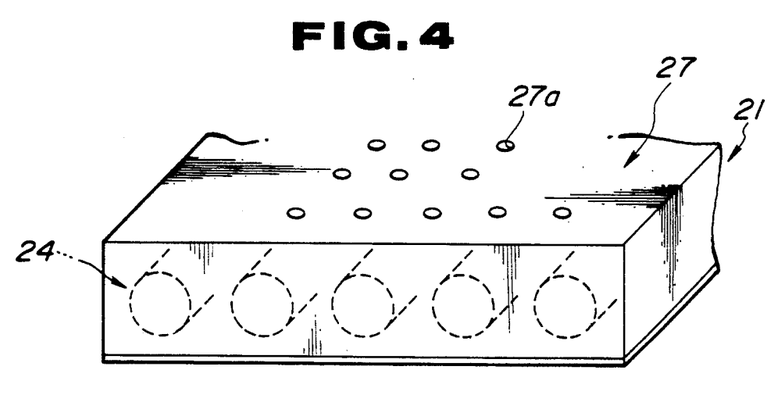
FIG. 4 is a fragmentary perspective view of the illuminating device illustrated in FIG. 3.
Figure 5:
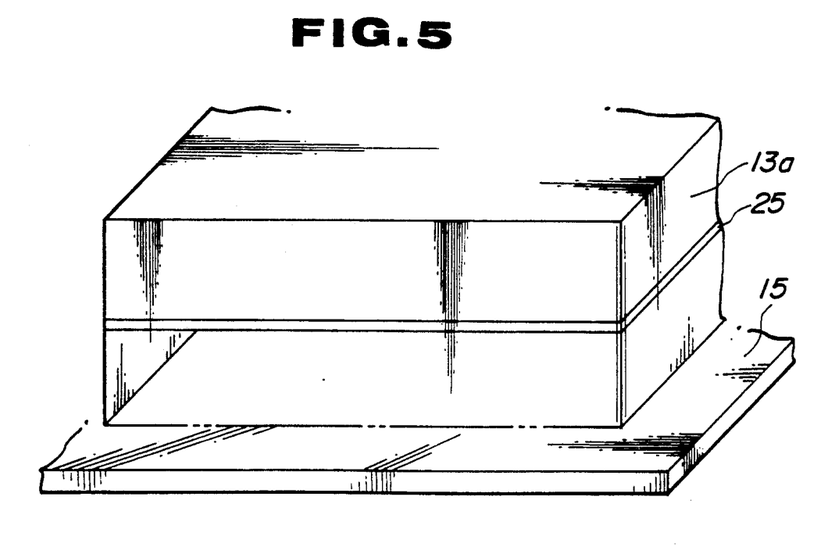
FIG. 5 is a fragmentary perspective view of a body of the plant culture apparatus illustrated in FIG. 1.

As shown in FIGS. 1 and 4, the light unit 24 comprises a plurality of light elements 24a which are arranged within the body 13 at a location above the transducing unit 25. The light elements 24a are spaced from each other in a horizontal plane and extend in parallel relation to each other. As shown in FIG. 1, the light elements 24a are arranged coarsely gradually toward a central axis of the body 13 and closely gradually toward both ends of the body 13. The central axis of the body 13 extends in parallel relation to the lighting elements 24a, and both ends of the body 13 extend in parallel relation to the central axis of the body 13. As opposed to conventional fluorescent lamps, the lighting elements 24a are not coated with phosphor for changing the ultraviolet rays to visible radiation. Accordingly, when voltage is applied to both electrodes of each of the lighting elements 24a, the lighting element 24a generates only ultraviolet rays due to a discharge effect.

Figure 2:
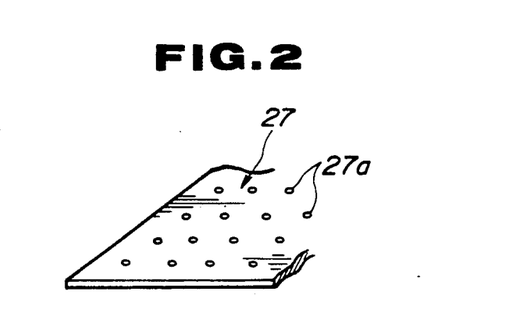
FIG. 2 is a fragmentary enlarged view of a ventilating plate of the plant culture apparatus illustrated in FIG. 1.

As illustrated in FIGS. 2 and 4, a ventilating plate 27 is arranged above the lighting elements 24a. The ventilating plate 27 is formed therein with a plurality of perforations 27a. The ventilating plate 27 has a lower surface which is coated with a reflecting material for reflecting the ultraviolet rays from the lighting elements 24a. Likewise, the body 13 has an inner surface section between the transducing unit 25 and the ventilating plate 27, and this inner surface section is coated with the above-mentioned reflecting material.

The transducing unit 25 is arranged slightly below the lighting elements 24a and in parallel relation to the culture bed 15.

A plurality of liquid-nutrient supply units (not shown) are arranged at a location below the entire lower surface of the culture bed 15. The liquid nutrient supply units supply nutrients liquid required by the plants 12 in accordance the requirements process of the plants 12.

An example of use of the plant culture apparatus 10 according to the embodiment will be described below.

The plants 12 being cultured are first planted in the culture bed 15 which is arranged within the body 13. After the appropriate number of the plants 12 have been planted, voltage is applied to both ends of each of the lighting elements 24a in order to provide, to the plants 12 light required for photosynthesis and heat for promoting growth. The lighting elements 24a, to which the voltage is applied, begin electric discharge therewithin and begin to emit ultraviolet rays toward the plants 12.

As indicated by the arrows in FIG. 3, the ultraviolet rays emitted from the lighting elements 24a are transduced into visible radiation when the ultraviolet rays pass through transducing unit 25 which is arranged below the lighting elements 24a.

In the manner described above, the visible radiation emitted from the lighting elements 24a and passing through the transducing unit 25 is uniformly emitted to the plants 12 which rest on the culture bed 15.

Figure 6:
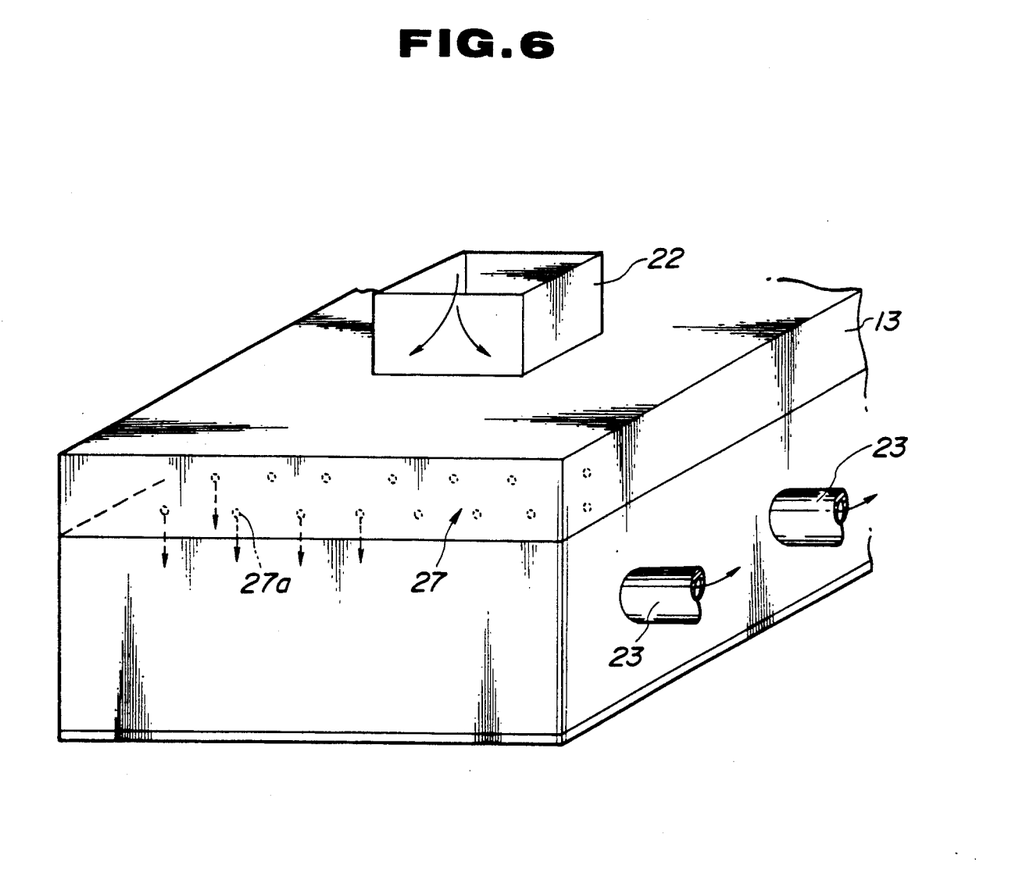
FIG. 6 is a fragmentary perspective view showing air conditioning through the body illustrated in FIG. 5.

If the illumination from the lighting elements 24a elevates the temperature within the body 13, the intake and discharge ducts 22 and 23 are operated to cause the air to flow through the body 13. Here, in order to remove heat at a location within the body 13 and above the transducing unit 25, as shown in FIG. 6, the outside air is introduced through the intake duct 22, and is blown into the illuminating device 21 through the perforations 27a in the ventilating plate 27 so that excessive heat is discharged through the discharge ducts 23.

Moreover, when necessary, nutrient liquid is supplied from the liquid nutrient supply units to the plants 12 to control the nutrition thereof.

According to the plant culture apparatus 10 having the construction and function described above, functional advantages illustrated in FIGS. 7(a) through 8(a) can be obtained as compared with the conventional plant culture apparatus.

Figure 7A:
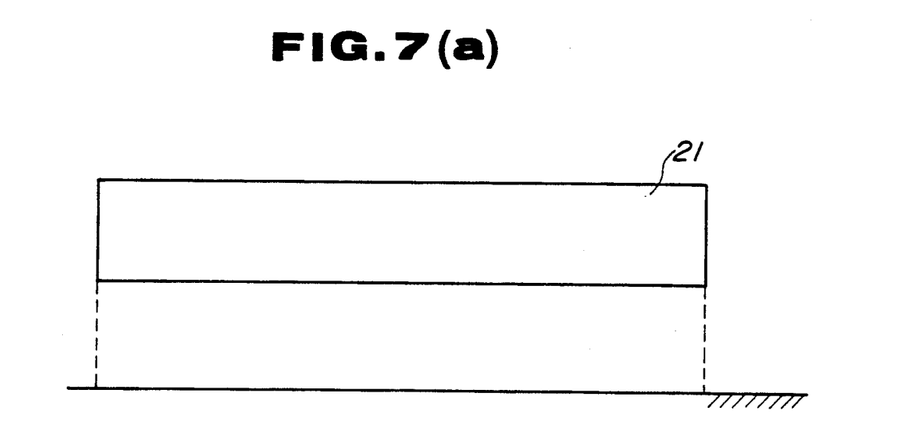
FIG. 7(a) is a side elevational view of the illuminating device illustrated in FIG. 1.
Figure 7B:
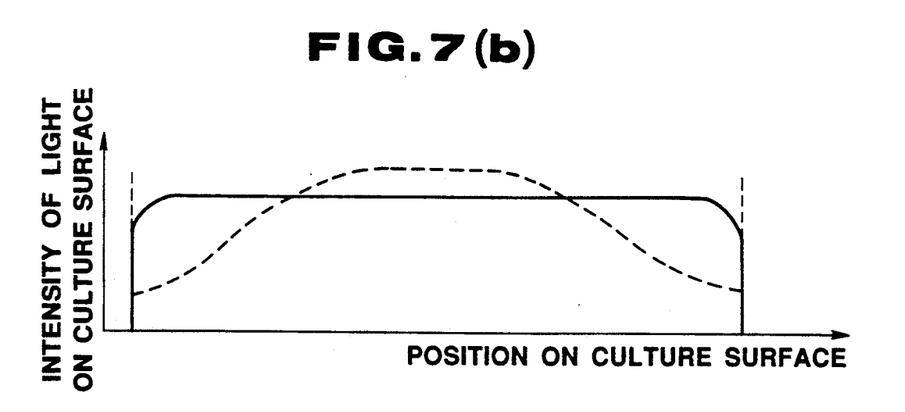
FIG. 7(b) is a view showing the relationship between a position on a culture surface and the intensity of light of the culture surface due to the illuminating device shown in FIG. 7(a).
Figure 7C:
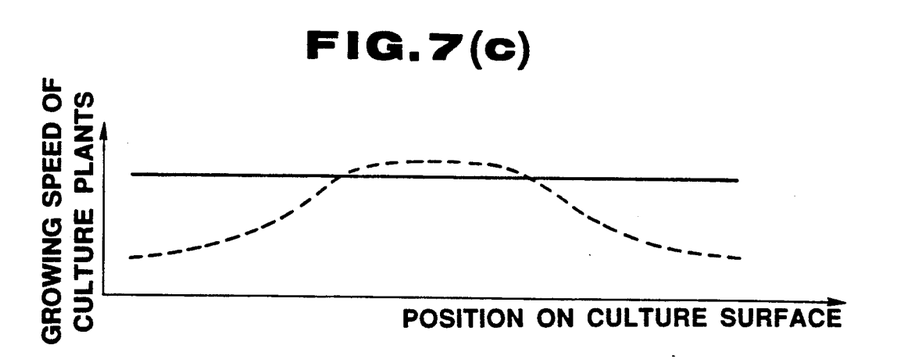
FIG. 7(c) is a view showing the relationship between the position of the culture surface and growing speed of plants being cultured due to the illuminating device shown in FIG. 7(a).

FIGS. 7(a) through 7(c) are views showing respectively, position on a culture surface, the relationship between the position on the culture surface and the intensity of light on the culture surface, and the relationship between the position on the culture surface and the growing rate of the plants 12.

That is, FIG. 7(a) is a side elevational view of the illuminating device 21, showing the position on the culture surface. FIG. 7(b) is a view showing the relationship between the position on the culture surface and the intensity of light on the culture surface. In FIG. 7(b), the position on the culture surface is taken as the abscissa, while the intensity of light is taken as the ordinate. A graph showing the intensity of light on the culture surface by the conventional illuminating method is indicated by the broken lines in FIG. 7(b), while the illuminating method in the illustrated embodiment is indicated by the solid lines in FIG. 7(b).

FIG. 7(c) is a view showing the relationship between the position on the culture surface and the growing rate of the plants 12 being cultured. In FIG. 7c, the position on the culture surface is taken as the abscissa, while the growing rate of the plants 12 is taken as the ordinate. A graph showing the growing rate by the conventional illuminating method is indicated by the broken lines in FIG. 7(c), while a graph showing the growing speed in the illustrated embodiment is indicated by the solid lines in FIG. 7(c).

Figure 8A:
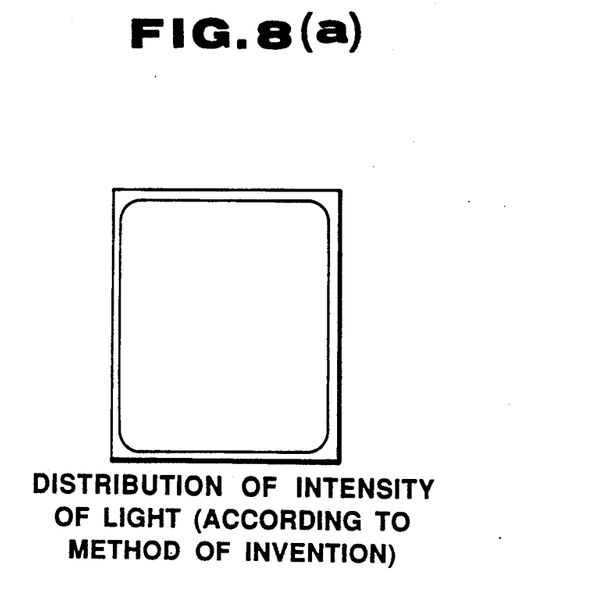
FIG. 8(a) is a view showing a distribution of the intensity of light with respect to the culture surface in the plant culture apparatus illustrated in FIG. 1.
Figure 8B:
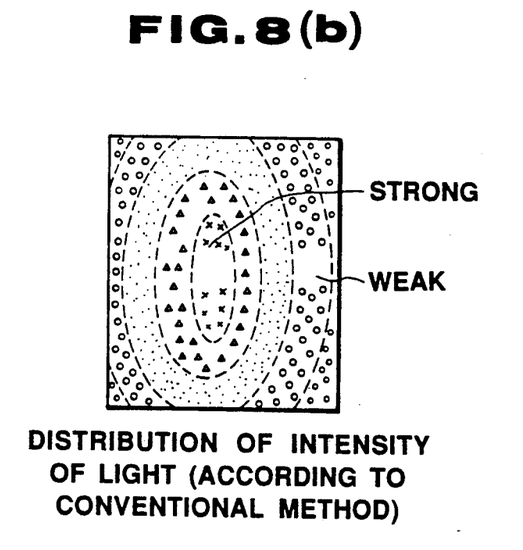
FIG. 8(b) is a view similar to FIG. 8(a), but showing the distribution in the conventional method.

Furthermore FIG. 8(a) is a view showing the relationship of the distribution of the intensity of light with respect to the culture surface in the illustrated embodiment, while FIG. 8(b) is a view showing the relationship of the distribution of the intensity of light with respect to the culture surface in the conventional method.

In FIG. 7(a), the position on the culture surface is taken as the abscissa, while the illuminating device of the illustrated embodiment is designated by the reference numeral 21. The reference numeral 21 also refers to the conventional illuminating device.

As will clearly be seen from FIGS. 7(b) and 8(b), the intensity of light in the conventional illuminating method gradually increases toward the central position on the culture surface. On the other hand, in the illuminating method of the illustrated embodiment, as will be apparent from FIGS. 7(b) and 8(a), it is possible to obtain a uniform intensity of light at any position on the culture surface.

By the above-mentioned distribution of the intensity of light on the culture surface, the growing speed of the plants 12 is as follows.

As will be seen from FIG. 7(c), in the conventional illuminating method, the growing rate is high, correspondingly to the intensity of light, gradually toward the center position on the culture surface, while the growing rate is gradually reduced correspondingly to the fall off in light intensity toward both side edges or both ends of the culture surface. Accordingly, the plants within the same culture apparatus are not of uniform size. In contrast, in the illuminating method of the illustrated embodiment, it is possible to obtain a uniform intensity of light at any position on the culture surface and it is also possible to obtain a uniform growing rate. Thus, the plants 12 become uniform in size, and it is possible to obtain a stable harvest of the cultured plants 12.

Furthermore, if illumination from the illuminating device 21 elevates the temperature of the air within the body 13 and above the transducing unit 25, the intake duct 22 and the discharge ducts 23 are operated to remove heat. According to the heat-removing method, the excessive heat generated due to illumination from the illuminating device 21 can easily be removed without any effect or influence on the culture space.

Figure 9A:
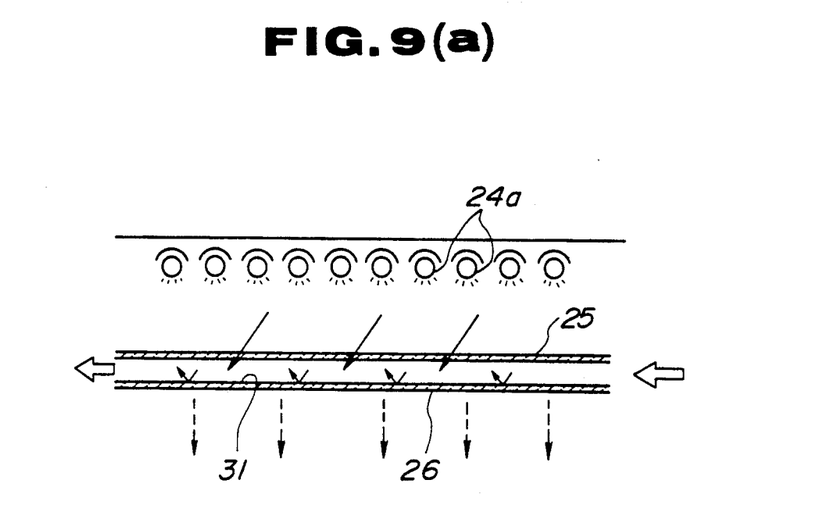
FIG. 9(a) is a fragmentary cross-sectional side elevational view of another embodiment of the invention.
Figure 9B:
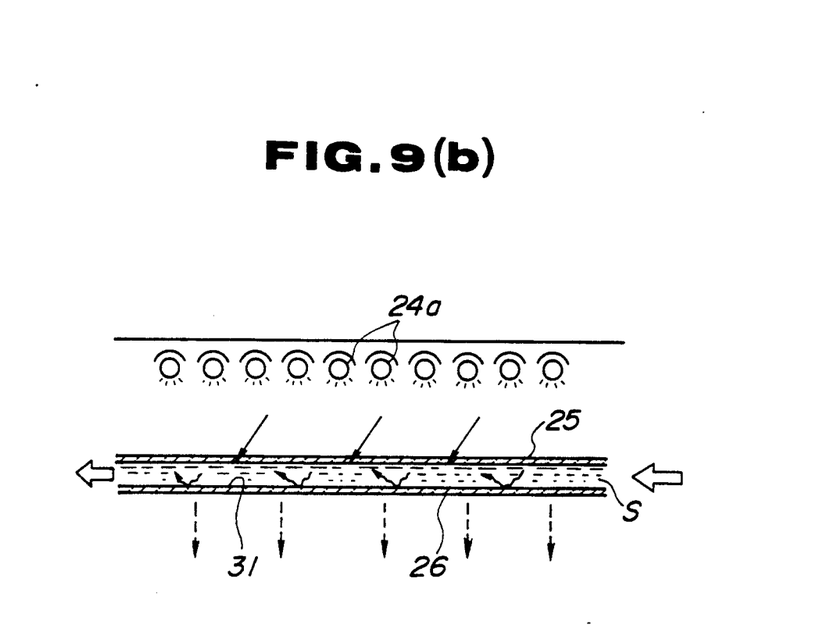
FIG. 9(b) is a view similar to FIG. 9(a), but showing still another embodiment of the invention.

Referring next to FIGS. 9(a) and 9(b), there are shown other embodiments of the invention. In the other embodiments, components and parts like or similar to those illustrated in FIGS. 1 through 8(a) are designated by the same or like reference numerals, and the description of such like or similar components and parts will be omitted to avoid repetition.

The embodiment illustrated in FIG. 9(a) is different from the embodiment illustrated in FIGS. 1 through 8(a) with respect to the removing structure for removing the excessive heat due to heat generation of the lighting elements 24a.

That is, the excessive-heat removing structure of the embodiment illustrated in FIG. 9(a) comprises a heat-blocking film 26 which transparent to visible wavelengths and which is arranged below the transducing unit 25 for blocking heat from the lighting elements 24a. A space S between the transducing unit 25 and the heat blocking film 26 is formed into a passage 31 through which a cooling medium passes as indicated by the arrows in FIG. 9(a). The excessive-heat removing structure illustrated in FIG. 9(a), is of a gas-cooling type in which gas is utilized as the cooling medium passing through the space S or the passage defined between the transducing unit 25 and the heat blocking film 26.

With the excessive-heat removing structure constructed as above, the gas serving as the cooling medium is not directly applied to the lighting elements 24a serving as a source of light. Accordingly, it is possible to prevent the intensity of light from being abruptly reduced due to reduction in temperature of the source of light.

That is, it is possible to remove the excess heat without significant reduction of the intensity of light. Furthermore, the heat recovery efficiency is high, and utilization of the heat is easy. Moreover, since the structure or construction is simple as described above, it is possible to restrain the cost with respect to the equipment or installation per se and maintenance thereof.

The excessive-heat removing structure illustrated in FIG. 9(b) is of a liquid-cooling type in which liquid is utilized as the cooling medium passing through the space S or the passage 31 defined between the transducing unit 25 and the heat blocking film 26. Other structures and constructions of the embodiment illustrated in FIG. 8(b) are the same as those of the previous embodiment shown in FIG. 9(a), and the description of the other structure and constructions will be omitted.

With the excessive-heat removing structure illustrated in FIG. 9(b), similarly to the previous excessive-heat removing structure shown in FIG. 9(a), abrupt reduction in the intensity of light can be prevented. The liquid used as the cooling medium is generally higher in heat conductivity than that of the gas, and is superior in efficiency of heat conduction. Accordingly, the following advantage can be obtained, that is, it is possible to efficiently absorb and remove the excess heat of air elevated due to heat generation of the lighting elements 24a.

Furthermore, it is also possible to color the liquid, and the colored liquid may pass through the passage 31 in order to block light of a particular wavelength.

The plant culture apparatus 10 according to the invention should not be limited to the above embodiments, but may have various variations and modifications. For example, the plant culture apparatus may comprise a humidifier and control means for automatically controlling temperature and humidity of the culture space. The control means includes detecting means for temperature and humidity. The detecting means monitors the temperature and humidity of the culture space to issue a detecting signal. The detecting signal is sent to the control means to control the illuminating device and the humidifier in order to maintain temperature and humidity most suitable for growth of the plants being cultured. Moreover, the body 13 is not limited to a box-like configuration described previously, and the body 13 may be applied to a culture apparatus on a large scale.

What is claimed is:

1. A plant culture apparatus comprising:
a body within which a plurality of plants to be cultured are disposed;
a culture bed arranged within said body for culturing the plants;
illuminating means arranged within said body for emitting a light to the plants on said culture bed; and
air-conditioning means mounted to said body for recirculating air through said body and removing heat from said body which is created by said illuminating means;
said illuminating means comprising:
lighting means for emitting ultraviolet rays to said plants; and
transducing means disposed below said lighting means for transducing the ultraviolet rays emitted from said lighting means to visible radiation when the ultraviolet rays pass through said transducing means, such that the visible radiation is uniformly emitted to said plants;

said transducing means having long-wave absorbability and comprising plate means having a surface which is entirely coated with phosphor;

wherein said air-conditioning means comprises:

an introducing duct means for introducing air into said body, said introducing duct means being mounted to an upper surface of said body; and discharge duct means for discharging air from said body, said discharge duct means being mounted to a peripheral surface of said body at a location above said transducing means.

2. The plant culture apparatus according to claim 1, wherein said air-conditioning means comprises an introducing duct means mounted to said body, said air being introduced into said body from the ambient atmosphere through said introducing duct means, and a discharge duct means mounted to said body, the air being discharged from said body to the ambient atmosphere through said discharge duct means.

3. The plant culture apparatus according to claim 1, wherein said body is formed by a container made of a heat insulating material.

4. The plant culture apparatus according to claim 1, wherein said body has an inner surface which is coated with a reflecting material.

5. The plant culture apparatus according to claim 1, wherein said culture bed is arranged at a bottom of said body and is formed by a sheet material having water absorbability.

6. The plant culture apparatus according to claim 1, wherein lighting means comprises a plurality of lighting elements which are arranged within said body at a location above said transducing means, said lighting elements being spaced from each other in a horizontal plane and extending in parallel relation to each other.

7. The plant culture apparatus according to claim 6, wherein said lighting elements are arranged in a spaced fashion toward a central axis of said body and in a close fashion toward both ends of said body, said central axis extending in parallel relation to said lighting elements, and said both ends of said body extending in parallel relation to said central axis of said body.

8. The plant culture apparatus according to claim 7, wherein each of said lighting elements generates only the ultraviolet rays due to an electric discharge effect.

9. The plant culture apparatus according to claim 1, further comprising ventilating plate means arranged above said lighting means, said ventilating plate means being formed therein with a plurality of perforations.

10. The plant culture apparatus according to claim 9, wherein said ventilating plate means has a lower surface coated with a reflecting material for reflecting the ultraviolet rays from said lighting means, and said body has an inner surface section between said transducing means and said ventilating plate means, said inner surface section being coated with said reflecting material.

11. The plant culture apparatus according to claim 1, wherein said transducing means is arranged below said lighting means and in parallel relation to said culture bed.

12. The plant culture apparatus according to claim 1, further including heat blocking means having light permeability and arranged below said transducing means for blocking heat from said lighting means.

13. The plant culture apparatus according to claim 12, further including passage means arranged between said transducing means and said heat blocking means wherein a cooling medium passes through said passage means.

14. The plant culture apparatus according to claim 13, wherein said cooling medium is a gas.

15. The plant culture apparatus according to claim 13, wherein said cooling medium is a liquid.

* * * * *